(12) United States Patent
Suruga et al.

(10) Patent No.: US 11,796,120 B2
(45) Date of Patent: Oct. 24, 2023

(54) SUPPORT COMPONENT, HOUSING STRUCTURE, AND EQUIPMENT

(71) Applicant: FUJIFILM Business Innovation Corp., Tokyo (JP)

(72) Inventors: Misaki Suruga, Kanagawa (JP); Naoto Chiba, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 146 days.

(21) Appl. No.: 17/376,089

(22) Filed: Jul. 14, 2021

(65) Prior Publication Data
US 2022/0307645 A1 Sep. 29, 2022

(30) Foreign Application Priority Data
Mar. 29, 2021 (JP) ................................ 2021-055146

(51) Int. Cl.
| F16M 7/00 | (2006.01) |
| G03G 21/16 | (2006.01) |
| F16M 11/24 | (2006.01) |
| D06F 39/12 | (2006.01) |
| A47B 91/02 | (2006.01) |

(52) U.S. Cl.
CPC .............. *F16M 7/00* (2013.01); *F16M 11/24* (2013.01); *G03G 21/1604* (2013.01); *A47B 91/022* (2013.01); *A47B 91/024* (2013.01); *D06F 39/125* (2013.01); *G03G 2215/00004* (2013.01)

(58) Field of Classification Search
CPC ........ F16M 7/00; F16M 11/24; A47B 91/022; A47B 91/024; G03G 21/1604; D06F 39/125
See application file for complete search history.

(56) References Cited

U.S. PATENT DOCUMENTS 2,828,578 A * 4/1958 Mccabe .............. B60B 33/0089
29/897
3,045,389 A * 7/1962 Arnit .................... A47B 91/024
248/188.4

(Continued)

FOREIGN PATENT DOCUMENTS

| JP | H07275959 | 10/1995 |
| JP | H10172218 | 6/1998 |

*Primary Examiner* — Tan Le
(74) *Attorney, Agent, or Firm* — JCIPRNET

(57) ABSTRACT

A support component includes a leg component having a male thread portion that is provided on at least an upper side of a rod extending in a height direction, and a pedestal portion that is provided larger than the rod and provided at a lower end portion of the rod, and a receiving component having a extruded portion that is provided, in a frame material including two vertically separated plate materials constituting a housing bottom portion of an equipment, in the plate material located on an upper side of the frame material and into which the male thread portion of the rod is screwed, and a through-hole that is provided in the plate material located on a lower side of the frame material and through which the rod passes, in which the support component enables height adjustment in a state in which the rod of the leg component is inserted through the extruded portion and the through-hole of the receiving component.

13 Claims, 16 Drawing Sheets

(56) References Cited

U.S. PATENT DOCUMENTS

| | | | | | |
|---|---|---|---|---|---|
| 3,175,795 | A | * | 3/1965 | Adams | A47B 91/024 |
| | | | | | 248/188.4 |
| 3,575,288 | A | * | 4/1971 | Brucken | B65D 19/14 |
| | | | | | 248/188.4 |
| 3,868,079 | A | * | 2/1975 | Johnson | A47B 91/024 |
| | | | | | 248/188.4 |
| 4,202,083 | A | * | 5/1980 | Gutner | B23P 13/00 |
| | | | | | 29/897 |
| 2013/0112822 | A1 | * | 5/2013 | Ishiwata | G03G 21/1619 |
| | | | | | 248/188.8 |

* cited by examiner

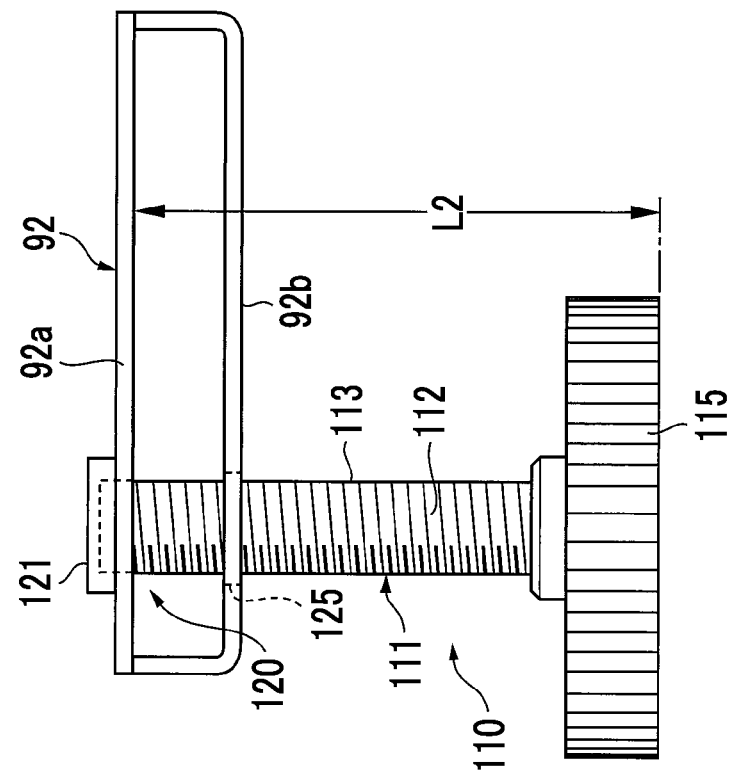
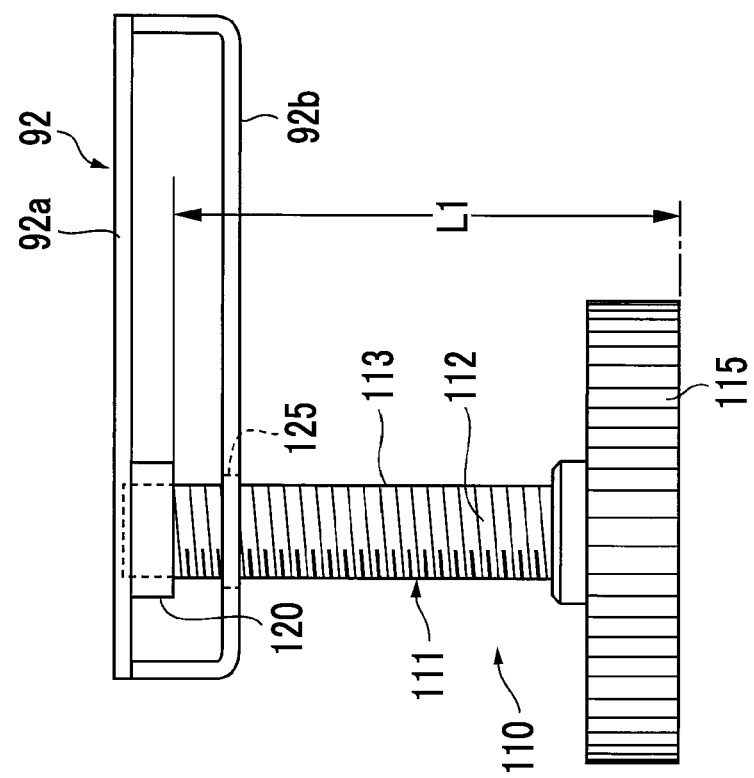

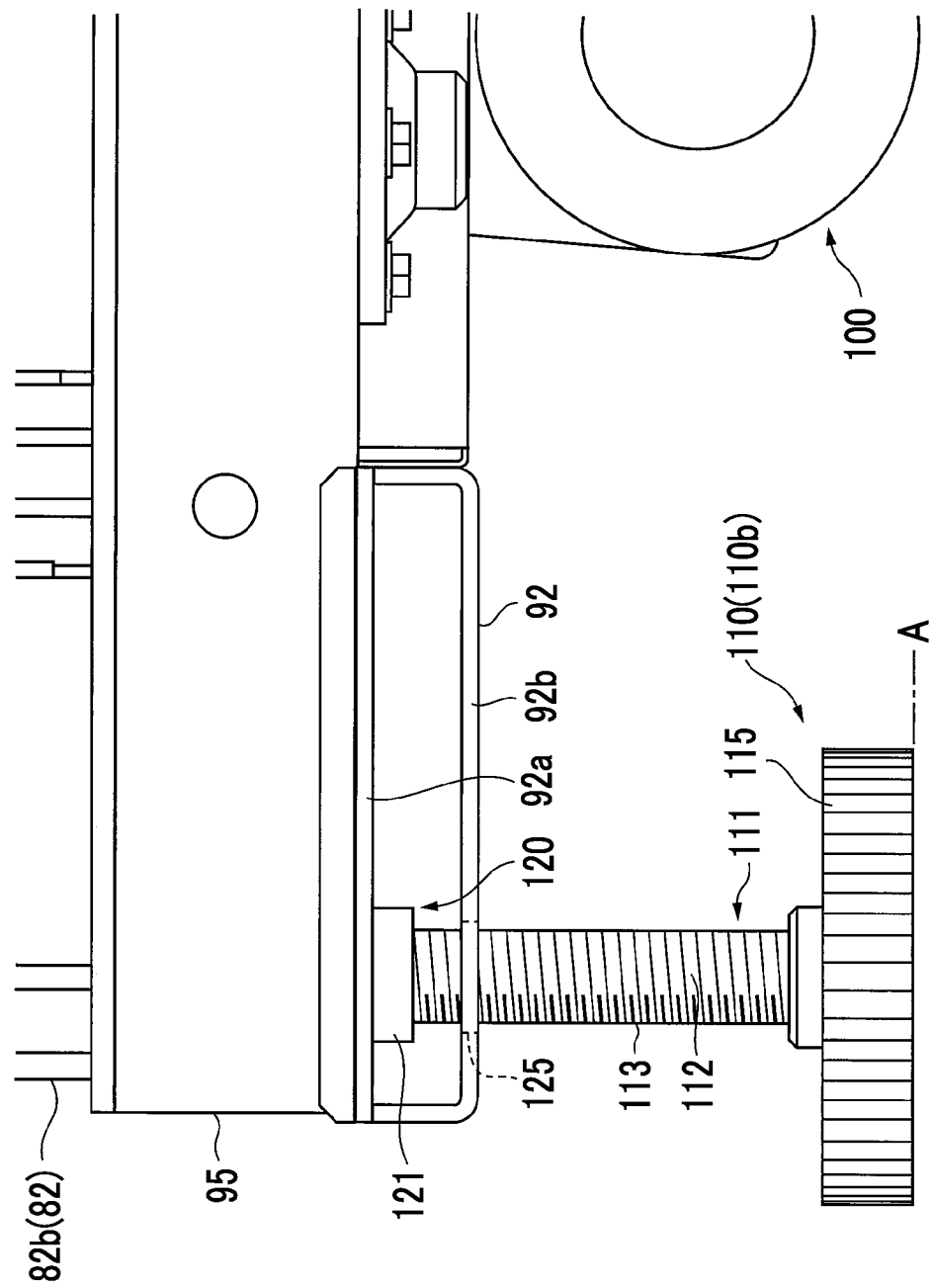

SUPPORT COMPONENT, HOUSING STRUCTURE, AND EQUIPMENT

CROSS-REFERENCE TO RELATED APPLICATIONS

This application is based on and claims priority under 35 USC 119 from Japanese Patent Application No. 2021-055146 filed Mar. 29, 2021.

BACKGROUND

(i) Technical Field

The present invention relates to a support component used for installing an equipment, a housing structure, and an equipment.

(ii) Related Art

In installing an equipment such as a multifunction device, a home appliance, and furniture, a support component may be used as a leg for height adjustment and leveling of the equipment.

As this kind of support component, for example, forms described in JP1999-172218A and JP1996-275959A are already known.

JP1999-172218A discloses a form in which a guide mechanism that guides a shaft that slides through a plate-shaped body is constituted by a through-hole formed in the plate-shaped body and a tubular portion integrally protruding in an axial direction of the shaft so as to surround the circumference of the through-hole, and the inner diameter of the tubular portion is formed to be slightly larger than the outer diameter of the shaft.

JP1996-275959A disclose a component mounting device including a guide portion protruding from a metal plate by drawing, and a locking portion that is formed by drawing or extrusion from the tip end portion of the guide portion and is provided with an outer diameter portion smaller than the outer diameter of the guide portion in at least a portion of the locking portion, in which a coming-off preventing portion of which at least a portion is larger than the locking portion is formed.

SUMMARY

Regarding a support component used in the related art to install an equipment, the component cost and the number of operations are increased due to welding of a nut that receives a leg component for height adjustment. In addition, it is difficult to maintain the supporting strength for the leg component without using a welding nut.

Aspects of non-limiting embodiments of the present disclosure relate to a support component used for installing an equipment, a housing structure, and an equipment that maintain the supporting strength for the leg component compared to a case where there is no receiving component in which a welding nut that receives a leg component for height adjustment is not used.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a support component including a leg component having a male thread portion that is provided on at least an upper side of a rod extending in a height direction, and a pedestal portion that is provided larger than the rod and provided at a lower end portion of the rod, and a receiving component having an extruded portion that is provided, in a frame material including two vertically separated plate materials constituting a housing bottom portion of an equipment, in the plate material located on an upper side of the frame material and into which the male thread portion of the rod is screwed, and a through-hole that is provided in the plate material located on a lower side of the frame material and through which the rod passes, in which the support component enables height adjustment in a state in which the rod of the leg component is inserted through the extruded portion and the through-hole of the receiving component.

BRIEF DESCRIPTION OF THE DRAWINGS

Exemplary embodiment (s) of the present invention will be described in detail based on the following figures, wherein.

Figure 15:
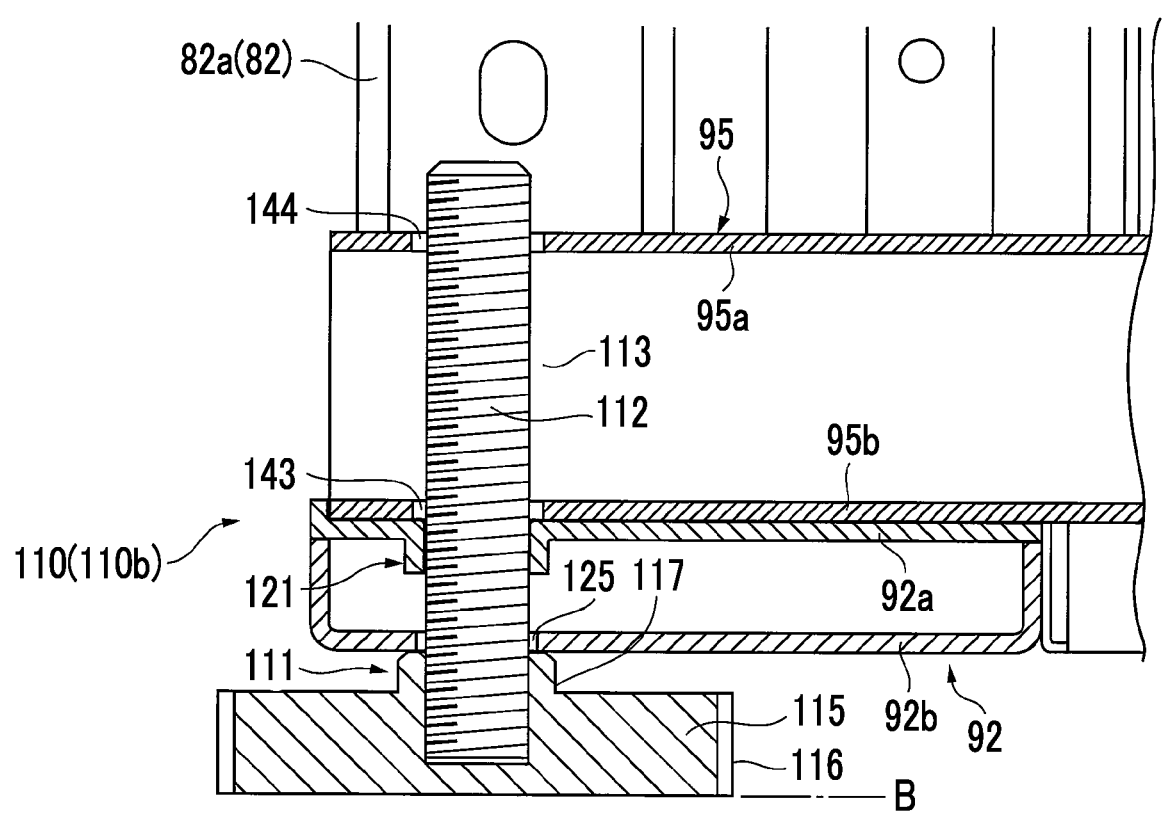
Figure 16A:
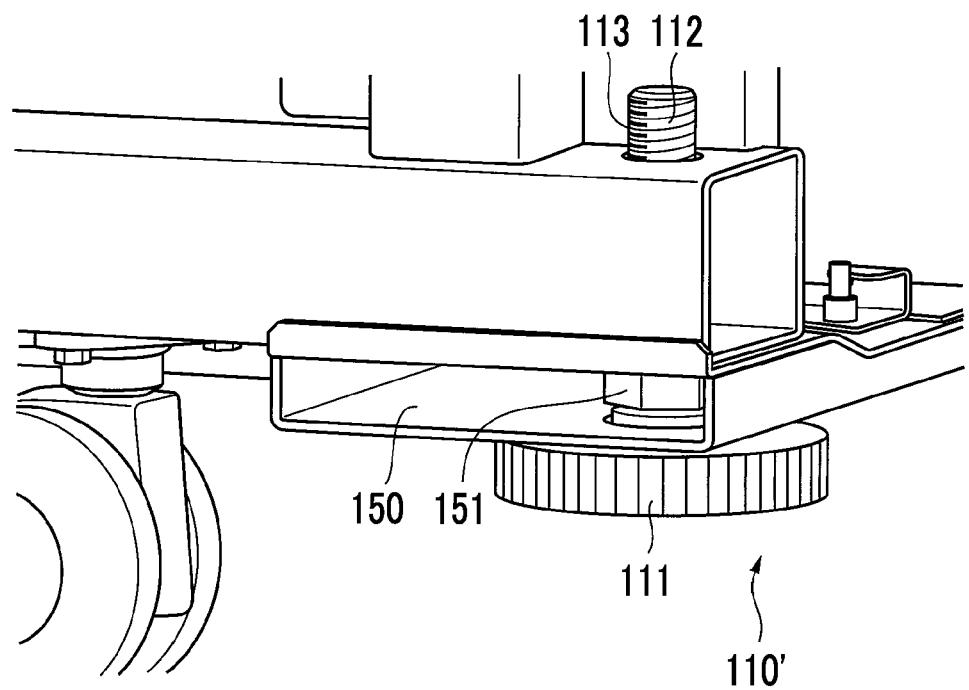
Figure 16B:
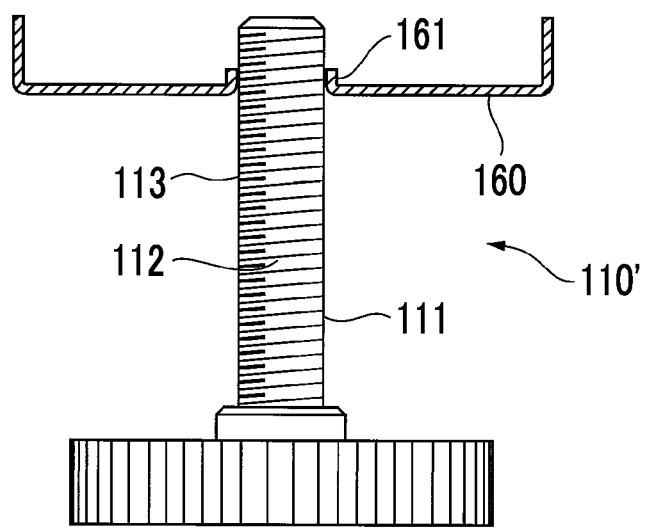

12C is an explanatory view showing an action of the receiving component of the support component used in the exemplary embodiment;

FIG. 13A is an explanatory view showing an allowable adjustment range of the leg component of the support component according to the first exemplary embodiment, and FIG. 13B is an explanatory view showing an allowable adjustment range of a leg component of a support component according to a first modified form;

FIG. 14 is an explanatory view showing a state when the support component provided on the front right side of the housing structure according to the first exemplary embodiment is used for height adjustment;

FIG. 15 is an explanatory view showing a state when the support component shown in FIG. 14 is retreated; and FIG. 16A is an explanatory view showing an overview of a support component according to a first comparative form, and FIG. 16B is an explanatory view showing an overview of a support component according to a second comparative form.

DETAILED DESCRIPTION

Overview of Exemplary Embodiment

Figure 1A:
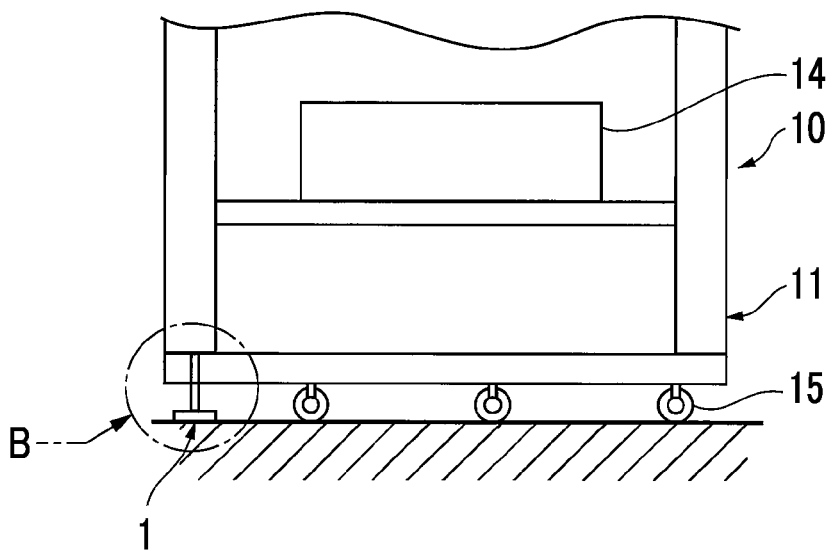
FIG. 1A is an explanatory view showing an overview of an exemplary embodiment of an equipment having a housing structure including a support component to which the present invention is applied.

FIG. 1A shows an overview of an exemplary embodiment of an equipment having a housing structure including a support component to which the present invention is applied.

In the figure, an equipment 10 includes a housing structure including a support component 1 for position adjustment during installation, a frame material 12 in which a receiving component 6 (see FIG. 1B), which is a constituent element of the support component 1, is formed, and a housing 11 that has the frame material 12 as a portion of a housing bottom portion and is framed together with another frame material 13, and various equipment elements 14 mounted on this kind of housing structure.

The equipment 10 mentioned here refers to a multifunction device that combines various functions such as a copier, a printer, a scanner, and a facsimile, and a heavy product such as a large household appliance and a large furniture. In a case of installing this kind of heavy product, it is necessary to stably support the heavy product from the viewpoint of safety, and for that purpose, the support component 1 is used as an element of the housing structure. The support component 1 of this example functions as a leg for the purpose of any or all of height adjustment, level maintenance, and falling prevention of the equipment 10 in a case where the equipment 10 is installed.

In addition, the equipment 10 may include a plurality of movable casters 15 at the lower portion of the housing 11 so as to be movable during installation. In this kind of equipment 10, the support component 1 is provided at the corner of the lower portion of the housing 11 on a side away from the support points of the plurality of casters 15.

Figure 1B:
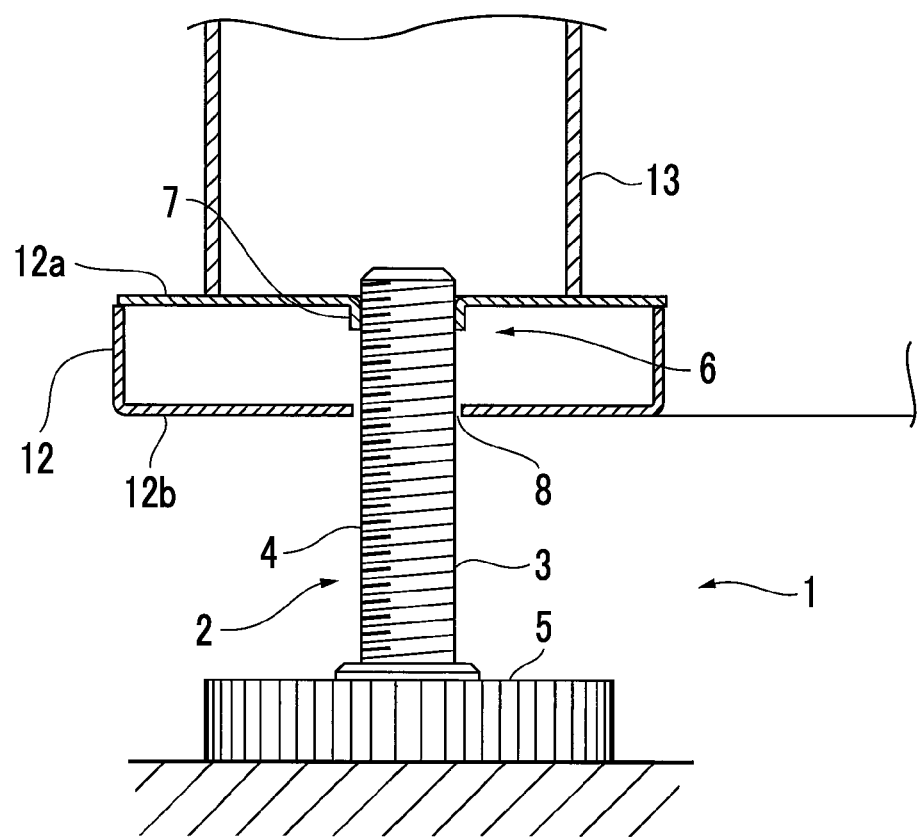
FIG. 1B is an explanatory view showing a configuration example of the support component shown in FIG. 1A.

Furthermore, in this example, as shown in FIGS. 1A and 1B, the support component 1 includes a leg component 2 having a male thread portion 4 that is provided on at least the upper side of a rod 3 extending in a height direction and a large pedestal portion 5 that is provided larger than the rod 3 at the lower end portion of the rod 3, and the receiving component 6 having an extruded portion 7 that is provided, in the frame material 12 including two vertically separated plate materials constituting the lower portion of the housing 11 of the equipment 10, in a plate material 12a located on the upper side of the frame material 12 and into which the male thread portion 4 of the rod 3 is screwed and a through-hole 8 that is provided in a plate material 12b located on the lower side of the frame material 12 and through which the rod 3 can pass, and enables height adjustment in a state in which the rod 3 of the leg component 2 is inserted through the extruded portion 7 and the through-hole 8 of the receiving component 6.

In such a technical component, the leg component 2 may have the rod 3 extending in the height direction and the male thread portion 4 on at least the upper side of the rod 3. However, the male thread portion 4 may be formed in substantially the entire area of the rod 3 or at least the upper side thereof and near the pedestal portion 5 so as to allow the leg component 2 to be held in a non-use state in which the leg component 2 is pushed toward the receiving component 6 side before height adjustment. However, in a form in which the male thread portion 4 is provided to be vertically separated, it is necessary to reduce the diameter between the upper portion of the rod 3 and the portion near the pedestal portion 5, and it should be noted that in a case where the narrow portion reaches the through-hole 8, the gap between the portion and the through-hole 8 widens, and the effect as a two-point support decreases. In addition, the pedestal portion 5 is, for example, preferably grounded in a wider area than the rod 3 in order to stably ground the leg component 2.

Regarding the receiving component 6, the frame material 12 constituting the lower portion of the housing 11 may include the two plate materials 12a and 12b that are vertically separated from each other, and may have the extruded portion 7 in the upper plate material 12a and the through-hole 8 in the lower plate material 12b. Here, the extruded portion 7 may face upward or downward, and is usually configured with a protruding amount depending on the thickness of the upper plate material 12a.

Furthermore, the frame material 12 in which the receiving component 6 is formed is not limited to a case of having a closed cross-sectional structure, and may use, for example, the walls of U-shaped channel materials facing each other as upper and lower plate materials. In this case, for example, in order to increase the supporting rigidity of the upper and lower plate materials of the frame material 12, the opening of the U-shaped channel materials is connected with one or a plurality of connecting materials.

Next, a representative form or a form of the support component according to the present exemplary embodiment will be described.

First, the frame material 12 preferably has, for example, a closed cross-sectional structure having a rectangular cross section from the viewpoint of increasing the supporting rigidity. Here, from the viewpoint of facilitating an operation of forming the receiving component 6, a closed cross-sectional structure having a rectangular cross section formed by joining a flat plate-shaped plate material to a frame material having a U-shaped cross section may be adopted.

In addition, a distance between the extruded portion 7 and the through-hole 8 in an up-down direction may be selected so that the rod 3 maintains the state of being inserted through the extruded portion 7 and the through-hole 8 in a state in which the leg component 2 is lowered to the ground contact position.

Moreover, the extruded portion 7 is, for example, preferably formed by making the plate material 12a located on the upper side protrude downward. In this example, compared to a case where the extruded portion 7 is formed so as to protrude upward, the tip end portion of the rod 3 is less likely to deviate from the extruded portion 7 during height adjustment of the rod 3 of the leg component 2 to the ground contact position.

The through-hole 8 may basically be a hole through which the rod 3 of the leg component 2 is inserted, but from the viewpoint of facilitating setting (assembly) of the leg component 2 with the receiving component 6, is, for example, preferably selected to be larger than the diameter (corresponding to the outer diameter of the male thread portion 4 of the rod 3 of the leg component 2) of the valley of the female thread portion of the extruded portion 7.

Furthermore, the through-hole 8 is, for example, preferably selected to be within the elastic deformation region of the rod 3 in a case where the leg component 2 receives the load of the equipment 10.

Moreover, the through-hole 8 is, for example, preferably formed with a tolerance equal to or greater than the tolerance of the hole diameter of the extruded portion 7.

As a form of the housing structure, as shown in FIGS. 1A and 1B, there is a form in which the upper portion of the frame material 12 in which the extruded portion 7 is formed in the receiving component 6 is connected and fixed to the other frame material 13. In this example, the supporting strength can be withstood by the other frame material 13, and the supporting strength for the receiving component 6 can be reduced accordingly.

Here, the other frame material 13 is, for example, preferably a closed cross-sectional structure having a rectangular shape or a columnar member extending in the height direction. Furthermore, from the viewpoint of smoothing a retreating operation of the leg component 2 when the leg component 2 of the support component 1 is retreated to a non-use position, for example, it is preferable that an escape hole through which the rod 3 of the leg component 2 can be inserted is formed in the other frame material 13.

Hereinafter, the present invention will be described in more detail based on the exemplary embodiments shown in the accompanying drawings.

First Exemplary Embodiment

Overall Configuration of Image Forming Apparatus

Figure 2:
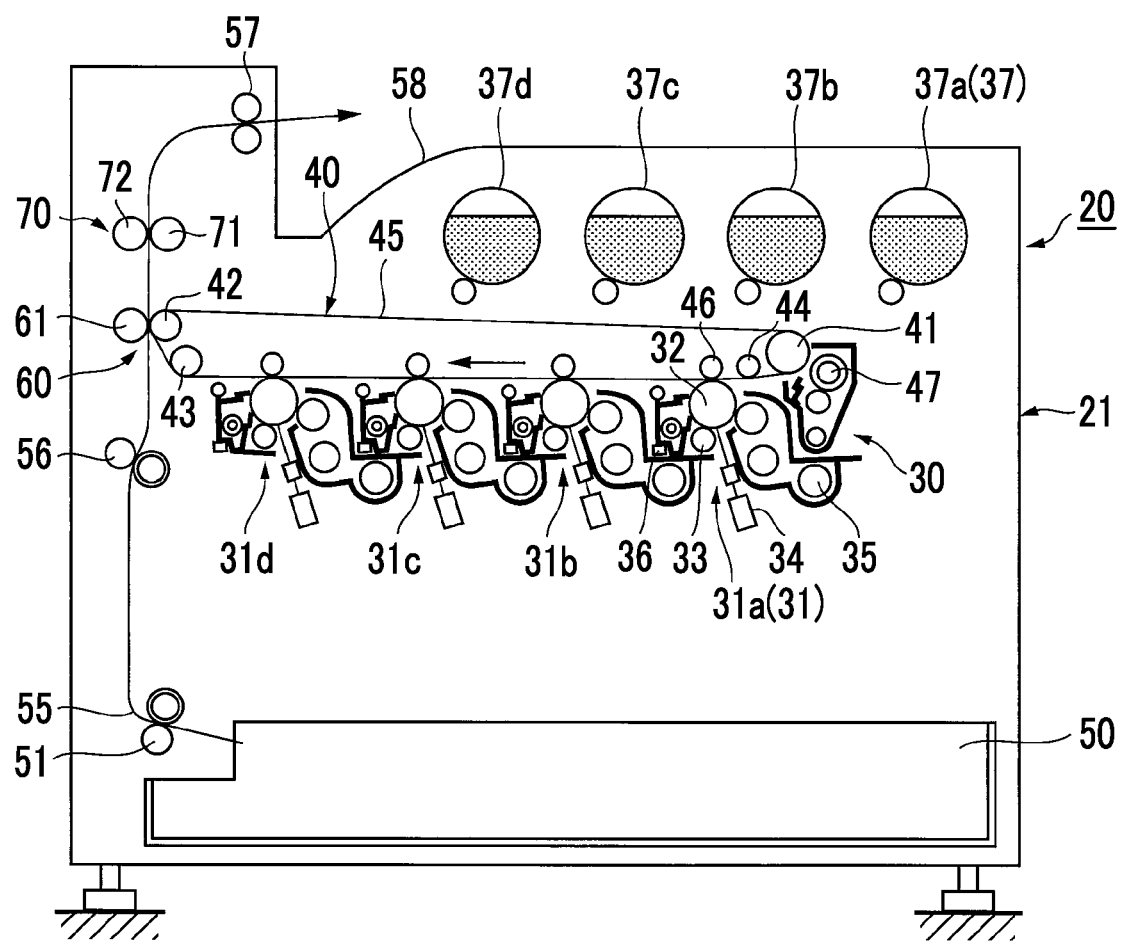
FIG. 2 is an explanatory view showing an overall configuration of an image forming apparatus as an equipment according to a first exemplary embodiment.

FIG. 2 is an explanatory view showing an overall configuration of an image forming apparatus as an equipment according to a first exemplary embodiment.

It should be noted that the image forming apparatus shown in FIG. 2 schematically shows one configuration example, and is not directly assembled into an apparatus housing shown in FIGS. 3 to 6.

In the figure, in an image forming apparatus 20, an image forming engine 30 that forms an image of a plurality of colors (four colors of yellow, magenta, cyan, and black in the present exemplary embodiment) is mounted in an apparatus housing 21, a recording material supply device 50 in which a recording material such as sheets is stored is arranged below the image forming engine 30, and a recording material transport path 55 from the recording material supply device 50 is arranged in a substantially vertical direction.

In this example, in the image forming engine 30, image forming units 31 (specifically, 31a to 31d) forming images of a plurality of colors are arranged in a substantially horizontal direction, above the image forming units 31, a transfer module 40 including, for example, a belt-shaped intermediate transfer body 45 that is circulated and moved along the arrangement direction of the image forming units, and an image of each color formed by the corresponding image forming unit 31 is transferred to a recording material via the transfer module 40.

In the present exemplary embodiment, the image forming units 31 (31a to 31b) form toner images, for example, for yellow, magenta, cyan, and black (the arrangement thereof is not necessarily in this order) in order from the upstream side in the circulation direction of the intermediate transfer body 45, and each of the image forming units 31 (31a to 31b) includes a photoreceptor 32, a charging device 33 (a charging roll in this example) that charges the photoreceptor 32 in advance, an exposure device (an LED writing head in this example) 34 that writes an electrostatic latent image on the corresponding photoreceptor 32 charged by the charging device 33, a developing device 35 that develops the electrostatic latent image formed on the photoreceptor 32 with the toner (for example, having a negative polarity in the present exemplary embodiment) of the corresponding color component, and a cleaning device 36 that cleans the residue on the photoreceptor 32.

Reference numerals 37 (specifically, 37a to 37d) indicate toner cartridges for supplying the color component toners to the corresponding developing devices 35.

In the present exemplary embodiment, in the transfer module 40, the belt-shaped intermediate transfer body 45 is stretched over a plurality of tension rolls 41 to 44 such that the intermediate transfer body 45 is circulated and moved using, for example, the tension rolls 41 as driving rolls. A primary transfer device (a primary transfer roll in this example) 46 is disposed on the back surface of the intermediate transfer body 45 corresponding to the photoreceptor 32 of each of the image forming units 31, and by applying a primary transfer voltage having a polarity opposite to the charging polarity of the toner to the primary transfer device 46, the toner image on the photoreceptor 32 is electrostatically transferred to the intermediate transfer body 45 side.

Furthermore, a belt cleaning device 47 is arranged upstream of the image forming unit 31a on the most upstream side of the intermediate transfer body 45 so as to remove the residual toner on the intermediate transfer body 45.

In the present exemplary embodiment, a secondary transfer device 60 is arranged at a portion corresponding to a tension roll 42 downstream of the image forming unit 31d on the most downstream side of the intermediate transfer body 45 such that a primary transfer image on the intermediate transfer body 45 is secondarily transferred (collectively transferred) to the recording material.

In this example, the secondary transfer device 60 includes a secondary transfer roll 61 arranged in pressure contact with the toner image holding surface side of the intermediate transfer body 45, and a backup roll (also serving as the tension roll 42 in this example) that is arranged on the rear surface side of the intermediate transfer body 45 and forms the counter electrode of the secondary transfer roll 61. In addition, for example, the secondary transfer roll 61 is grounded, and a secondary transfer voltage having the same polarity as the charging polarity of the toner is applied to the backup roll (the tension roll 42).

The recording material supply device 50 is provided with a supply roll 51 that supplies the recording material, a transfer roll (not shown) is arranged in the recording material transport path 55, and a positioning roll (registration roll) 56 that supplies the recording material to a secondary transfer portion at a predetermined timing is arranged in the recording material transport path 55 located immediately before the secondary transfer portion.

Furthermore, a fixing device 70 is provided in the recording material transport path 55 located downstream of the secondary transfer portion, and the fixing device 70 includes, for example, a heating fixing roll 71 in which a heater (not shown) is embedded, and a pressurizing fixing roll 72 that is arranged in pressure contact with the heating fixing roll 71 to rotate following the heating fixing roll 71. A discharge roll 57 that discharges the recording material in the apparatus housing 21 is provided downstream of the fixing device 70 to sandwich, transfer, and discharge the recording material, and the recording material is stored in a recording material storage receiver 58 formed on the upper portion of the apparatus housing 21.

Although not shown in this example, as a matter of course, a manual feed supply device for the recording material and a two-sided recording module that enables two-sided recording of the recording material may be separately provided.

Structure of Apparatus Housing

Figure 3:
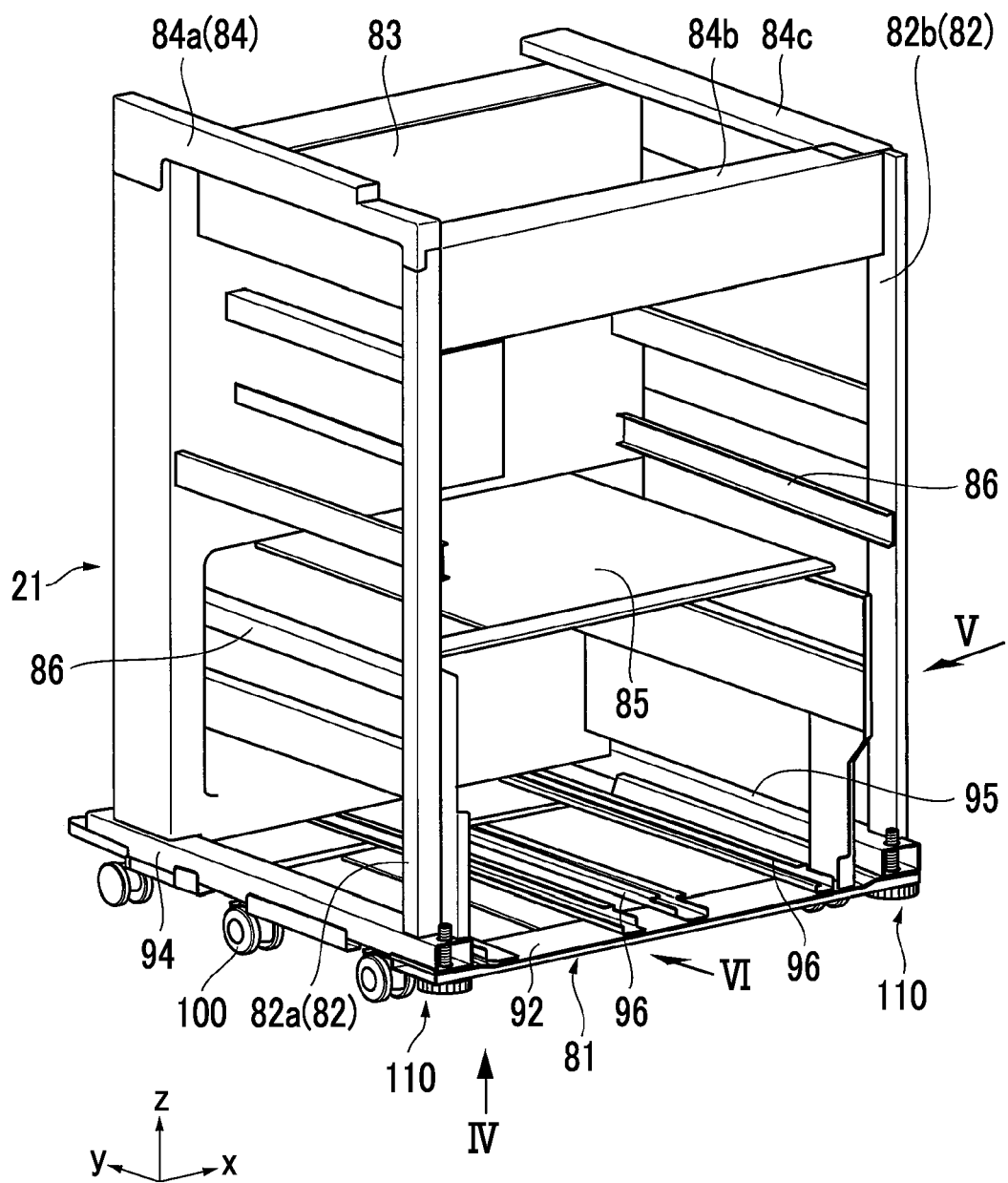
FIG. 3 is an explanatory view showing a housing structure of the image forming apparatus according to the first exemplary embodiment.
Figure 4:
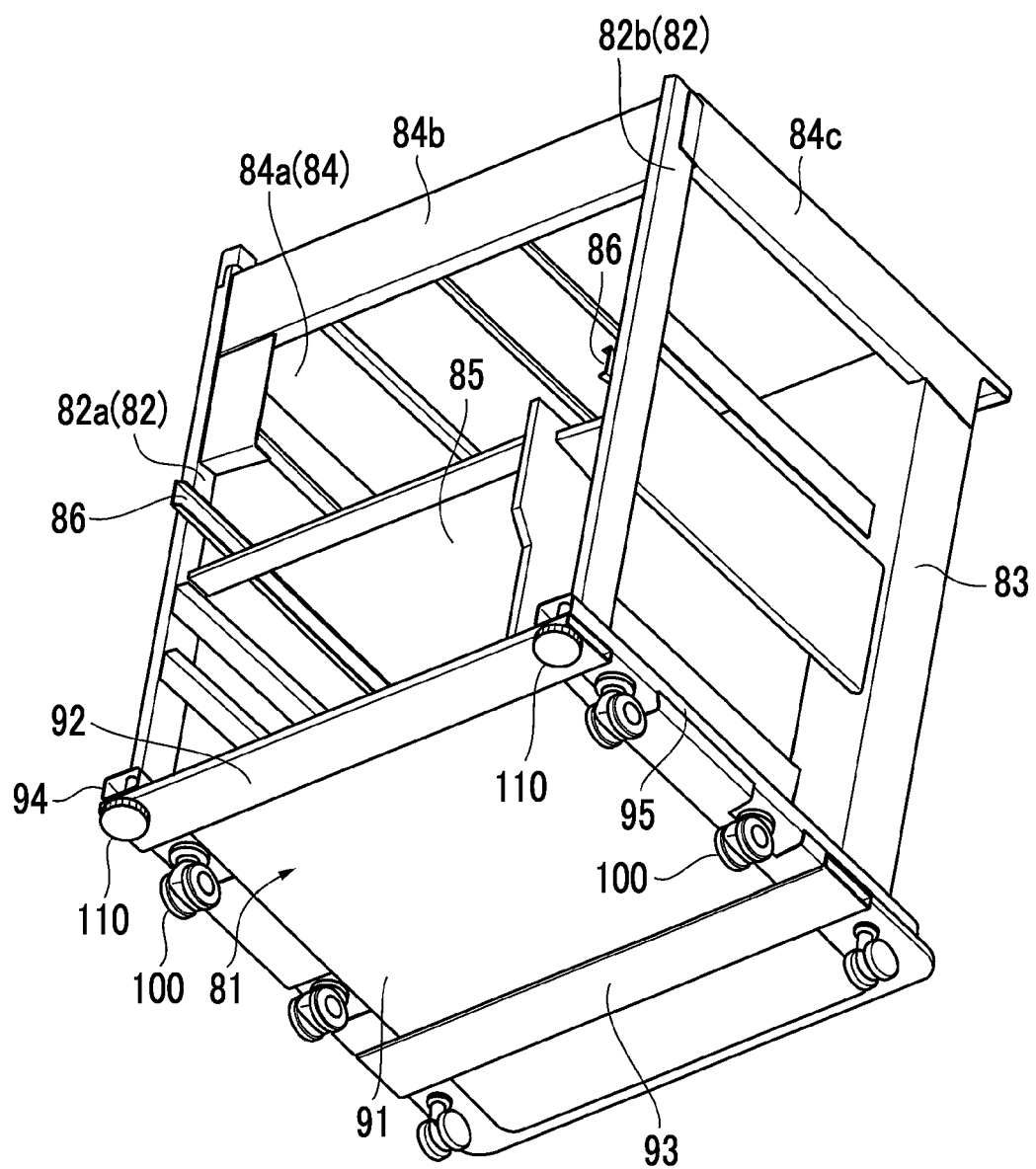
FIG. 4 is a perspective view seen in an IV direction (corresponding to an obliquely downward direction) in FIG. 3.

In the present exemplary embodiment, the apparatus housing 21 has a substantially rectangular housing bottom portion 81, for example, as shown in FIGS. 3 and 4, housing column frames 82 (specifically, 82*a* and 82*b*) that are upright in a columnar shape along a z direction (corresponding to the up-down direction) in FIG. 3 are provided at both corners of the front side of the housing bottom portion 81, a housing back portion 83 that partitions the back surface side is provided on the inner side (rear side) of the housing bottom portion 81, and housing connecting frames 84 (specifically 84*a* to 84*c*) stretched on the three planes other than the housing back portion 83 are connected on the upper portions of the housing column frames 82 and the housing back portion 83.

In this example, the apparatus housing 21 is provided with a housing partition frame 85 above the housing bottom portion 81, and includes an upper housing portion that is provided above the housing partition frame 85 to store the image forming engine 30 and the toner cartridges 37 and a lower housing portion that is provided below the housing partition frame 85 to store the recording material supply device 50. In this example, the housing column frame 82 is configured as vertically separated bodies by the upper housing portion and the lower housing portion, which are positioned and fixed by a positioning member and a fixing member (not shown). The housing positions may not be vertically divided, but may be an integrated housing position.

In this example, for the housing column frames 82 and the housing connecting frames 84, a square pipe having a closed cross-sectional structure having a rectangular cross section may be used, or a channel material having a U-shaped cross section or an L-shaped cross section other than the closed cross-sectional structure may also be used. For the housing back portion 83 and the housing partition frame 85, a portion of the flat plate may be embossed, or the peripheral edge may be provided with a flange for compensation.

Between the housing column frames 82 and both sides of the housing back portion 83 in the apparatus housing 21, housing reinforcing frames 86 are appropriately stretched to secure the rigidity of the apparatus housing 21 while achieving a reduction in the weight of the apparatus housing 21. Here, the cross-sectional structure of the housing reinforcing frame 86 is not particularly limited, and a long flat plate may be used.

Configuration Example of Housing Bottom Portion

In this example, as shown in FIGS. 3 and 4, the housing bottom portion 81 has a substantially rectangular bottom plate 91 made of metal (for example, SUS), frame materials 92 and 93 (hereinafter, referred to as left-right frame materials as necessary) made of metal (for example, SUS) extending in an x direction (corresponding to the left-right direction of the apparatus housing 21) in FIG. 3 of the apparatus housing 21 are fixed to the lower surface of the front side and the rear side (inner side) of the bottom plate 91 by welding or the like, and frame materials 94 and 95 (hereinafter, referred to as front-rear frame materials as necessary) made of metal (for example, SUS) extending in a y direction (corresponding to the front-rear direction of the apparatus housing 21) in FIG. 3 of the apparatus housing 21 are fixed to the upper surface of both sides in the left-right direction of the bottom plate 91 by welding or the like.

In this example, while each of the frame materials 92 to 95 consists of a square pipe having a closed cross-sectional structure having a rectangular cross section, the left-right frame materials 92 and 93 use square pipes having a flat thickness in the up-down direction compared to the front-rear frame materials 94 and 95.

Furthermore, in this example, the housing column frames 82 (82*a* and 82*b*) and the housing back portion 83 are provided corresponding to the intersections of the front-rear frame materials 94 and 95 with the left-right frame materials 92 and 93.

An appropriate number of guide rails 96 are provided on the upper surface of the bottom plate 91 of the housing bottom portion 81 to support the recording material supply device 50 so as to be pulled out along the front-rear direction.

Support Structure of Apparatus Housing

Figure 5:
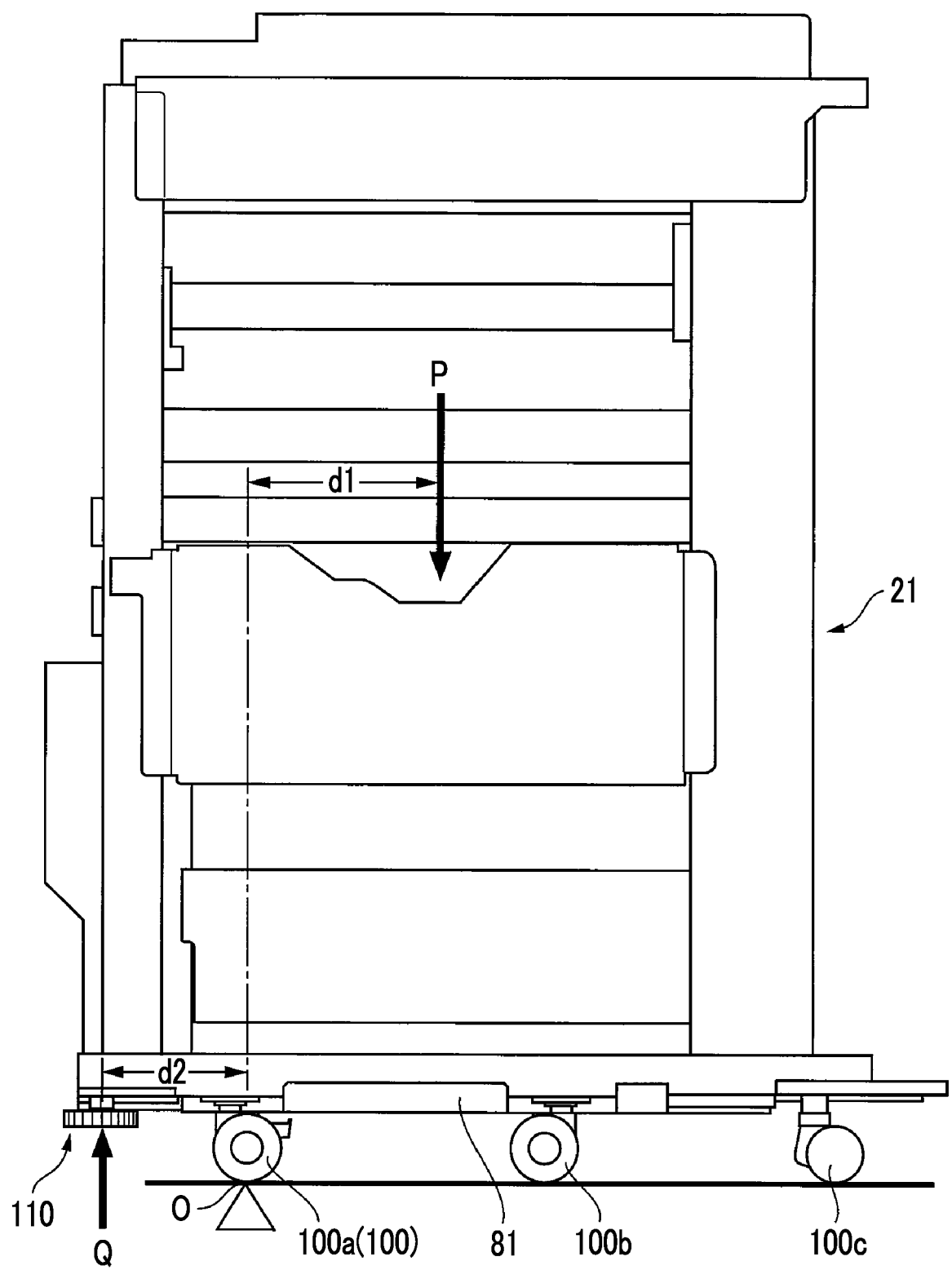
FIG. 5 is a perspective view seen in a V direction (corresponding to a right direction in the figure) in FIG. 3, and in particular, is an explanatory view showing a layout of the support component of this example.

In the present exemplary embodiment, as shown in FIGS. 3 to 5, the support structure of the apparatus housing 21 includes plurality of casters 100 that movably support the apparatus housing 21, and adjusters 110 as a support component for height adjustment of the apparatus housing 21.

In this example, a plurality of (three in this example) casters 100 are symmetrically provided at portions of the lower surface of the bottom plate 91 of the housing bottom portion 81 on both sides in the left-right direction corresponding to the front-rear frame materials 94 and 95 at intervals in the front-rear direction.

Here, as shown in FIG. 5, a center of gravity position P of the image forming engine 30 or the like mounted in the apparatus housing 21 is assumed to be near the substantially center of the housing bottom portion 81 of the apparatus housing 21. However, of the casters 100 (specifically, 100*a* to 100*c*) in the three rows in the front-rear direction, the casters 100 (100*b* and 100*c* in this example) in the two rows are arranged closer to the inner side (rear side) than the center of gravity position P, and the caster 100 (100*a* in this example) in the first row is arranged closer to the front side than the center of gravity position P.

Then, in this example, as shown in FIGS. 3 to 6, the adjusters 110 (specifically, 110*a* and 110*b*) are provided at the lower portions on both sides in the longitudinal direction of the left-right frame material 92 located on the front side of the housing bottom portion 81.

In this example, focusing on the dimensions of the apparatus housing 21 in the front-rear direction, in a case where the distance in the front-rear direction between the center of gravity position P of the apparatus housing 21 and an installation position O of the caster 100 (100*a*) in the first row on the front side is indicated as d1 and the distance in the front-rear direction between an installation position Q of the caster 100 (100*a*) in the first row on the front side and an installation position of the adjuster 110 is indicated as d2, in a case where an overturning load (apparatus weight) from the rear side of the image forming apparatus is withstood, a load corresponding to a ratio of d1/d2 of the apparatus weight in the up-down direction with the caster 100 (100a) on the front side as a fulcrum and an applied external force is applied to the adjuster 110. Therefore, the adjuster 110 needs to be designed to have sufficient supporting strength against the load applied in the up-down direction.

Configuration Example of Caster

Figure 8:
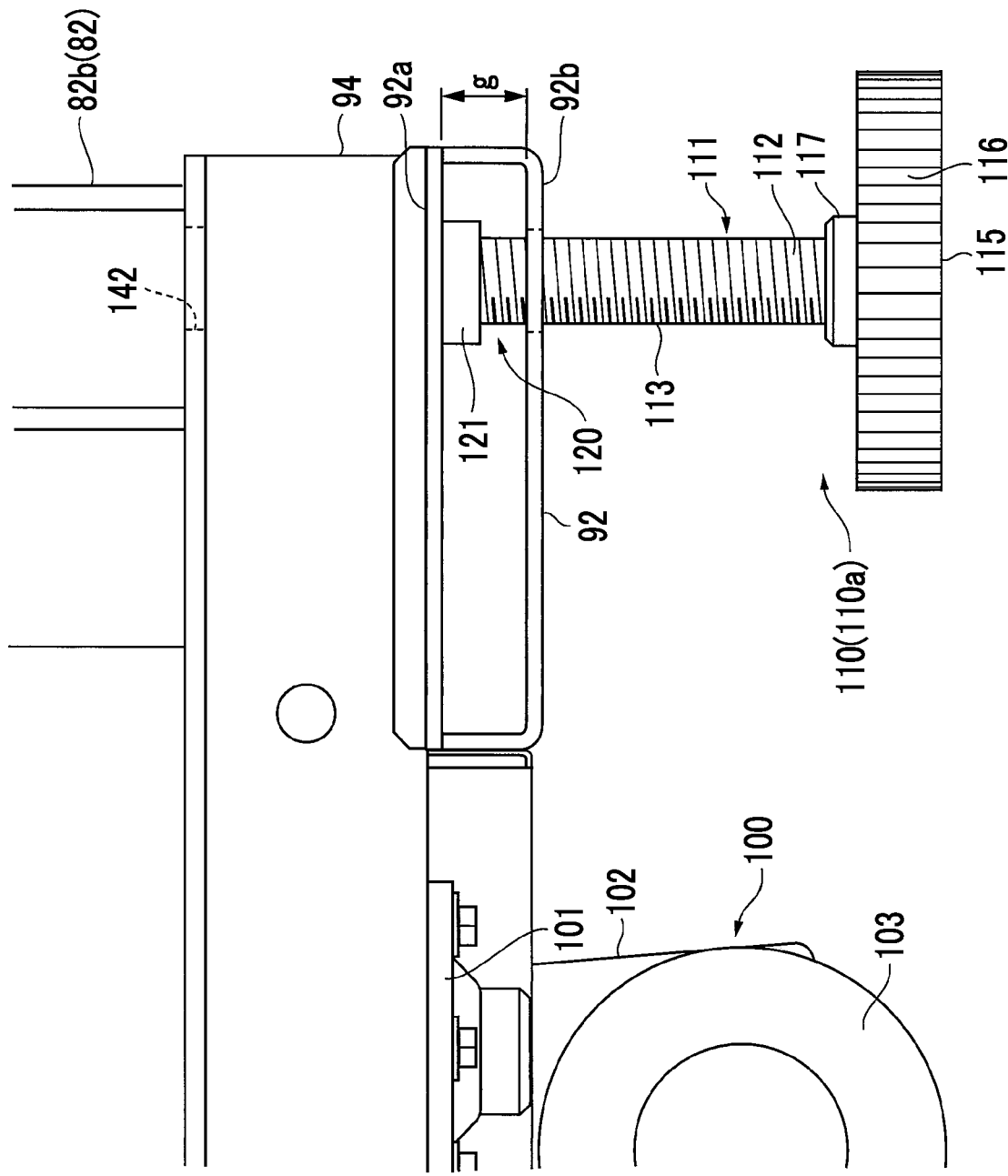
FIG. 8 is a perspective view seen in a VIII direction in FIG. 7.
Figure 9:
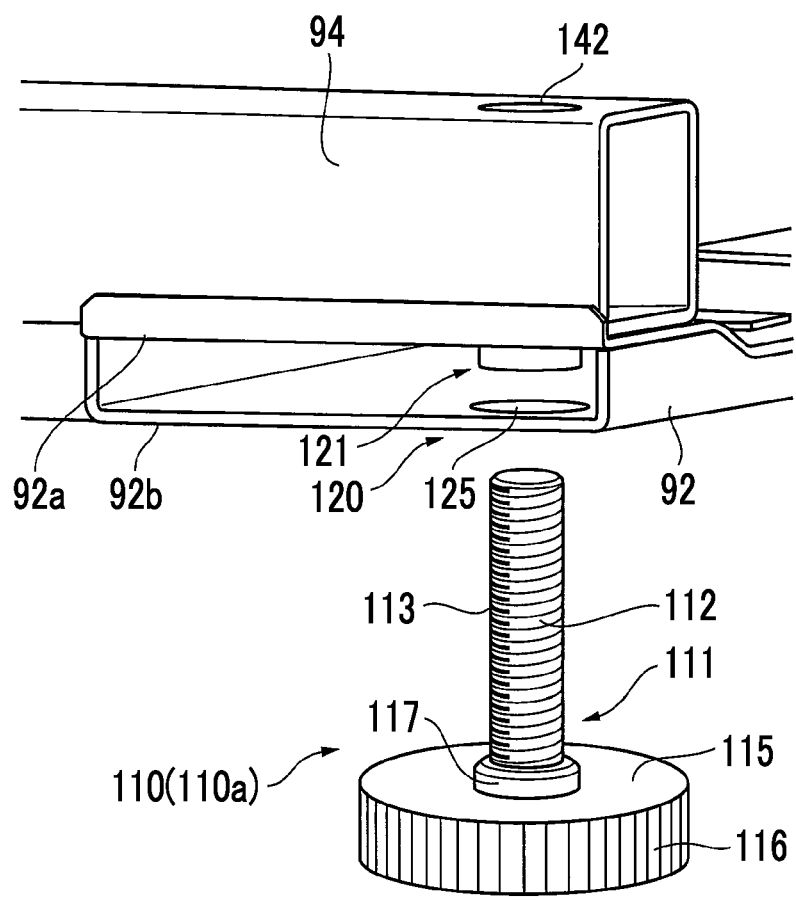
FIG. 9 is an explanatory view showing a state in which a leg component of the support component is detached from a receiving component in FIG. 8.

In the present exemplary embodiment, as shown in FIG. 8, the caster 100 has mounting plates 101 at the bottom portions of the bottom plate 91 of the housing bottom portion 81 on both sides in the left-right direction, wheel holders 102 are rotatably provided on the mounting plates 101 via bearings, and the axles of wheels 103 are rotatably held by the wheel holders 102.

Configuration Example of Adjuster (Support Component)

Figure 6:
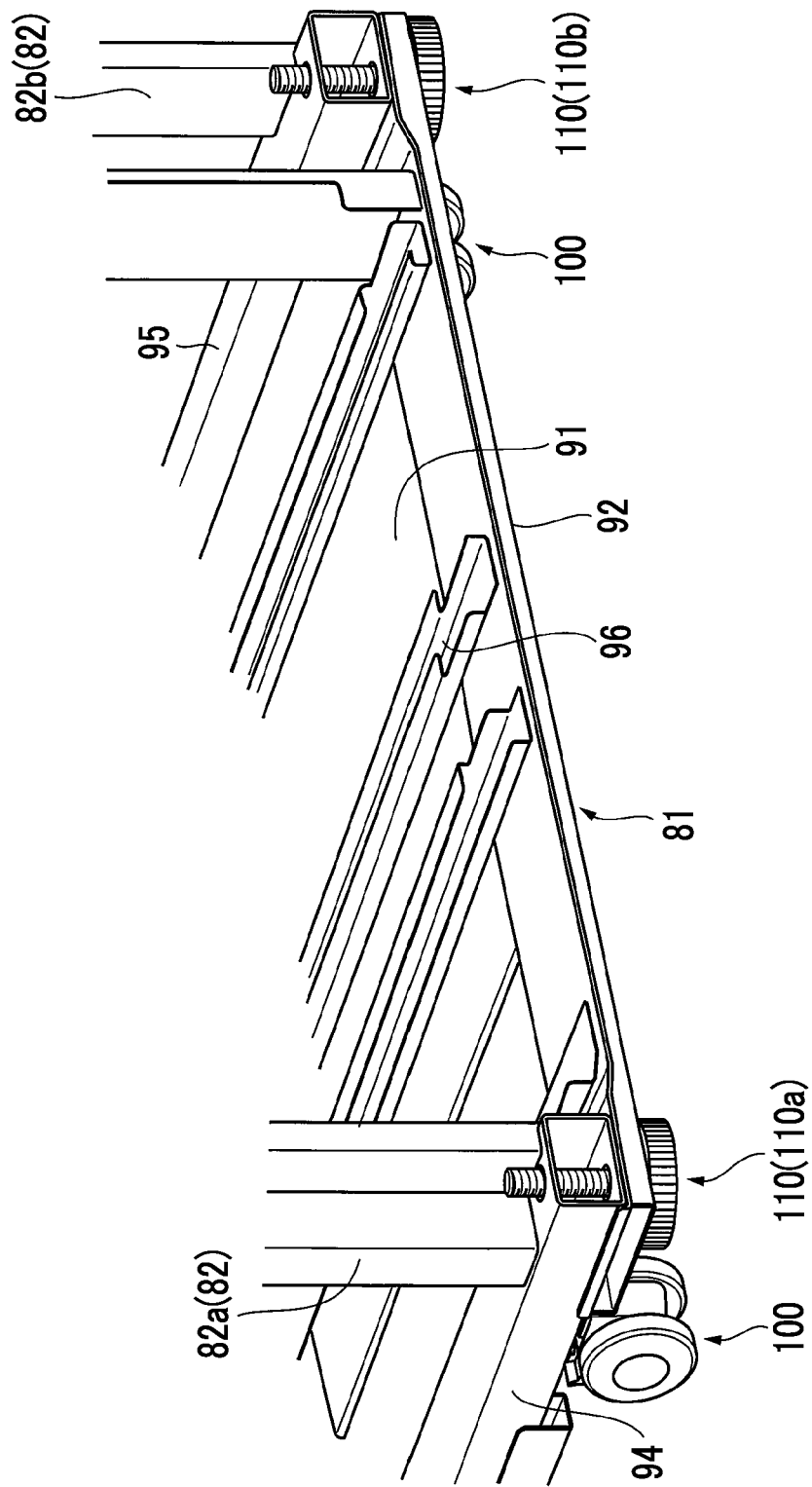
FIG. 6 is an explanatory view showing a portion of a peripheral structure of the support component (adjuster) of a housing bottom portion as viewed in a VI direction (corresponding to a front direction) in FIG. 3.

In the present exemplary embodiment, as shown in FIG. 6, the basic configurations of the adjusters 110 (110a and 110b) located on the left and right are partially different in the configuration of a mounting portion between the adjusters 110 (110a and 110b), specifically, slightly different in the configurations of the housing column frames 82 (82a and 82b) provided on the front side of the front-rear frame materials 94 and 95 constituting the housing bottom portion 81, but are configured in substantially the same manner.

Therefore, in this example, the adjuster 110 (110a) located on the left side in FIG. 6 will be described in detail as an example, and the adjuster 110 (110b) located on the right side in FIG. 6 will be briefly supplementarily described.

One Adjuster 110a

In this example, as shown in FIGS. 6 to 13, the adjuster 110 (110a) includes an adjuster foot 111 as a leg component for height adjustment, and a receiving component 120 that receives and supports the adjuster foot 111.

Here, in the adjuster foot 111, a male thread portion 113 is formed in substantially the entire area of a rod 112 extending in the height direction, and a pedestal portion 115 having a larger outer diameter than the male thread portion 113 of the rod 112 is provided at the lower end portion of the rod 112.

In this example, the rod 112 may be appropriately selected as long as the rod 112 is made of a material that is a metal having high bending strength and has excellent threading workability. For example, a SUM material having better threading workability than a steel material is used.

In the pedestal portion 115, for example, a disk-shaped pedestal body is formed using, for example, a PC resin or an ABS region, a recessed portion that stores the lower end portion of the rod 112 is formed at the center of the pedestal body, and the lower end portion of the rod 112 is inserted into the recessed portion and fixed by an adhesive or the like. An uneven portion 116 for preventing slippage during a rotation operation is formed on the outer circumferential portion of the pedestal portion 115, and a stepped portion 117 is further formed in the periphery of the recessed portion of the pedestal portion 115, such that the area of the connection portion between the recessed portion of the pedestal portion 115 and the lower end portion of the rod 112 is increased and thus the connecting strength between the two is secured.

In this example, although the stepped portion 117 is formed in the pedestal portion 115, the stepped portion 117 is not always necessary and may be appropriately selected.

The receiving component 120 includes an extruded portion 121 that is provided in a plate material 92a located on the upper side of the left-right frame material 92 that is a constituent element of the housing bottom portion 81 and into which the male thread portion 113 of the rod 112 is screwed, and a through-hole 125 that is provided in a plate material 92b located on the lower side of the left-right frame material 92 and through which the rod 112 can pass.

Figure 10A:
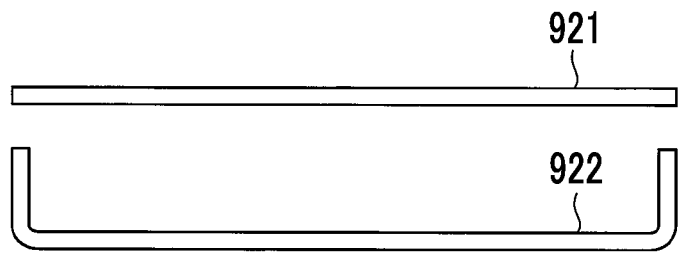
FIGS. 10A to 10C are explanatory views showing a manufacturing example of the receiving component of the support component.
Figure 10B:
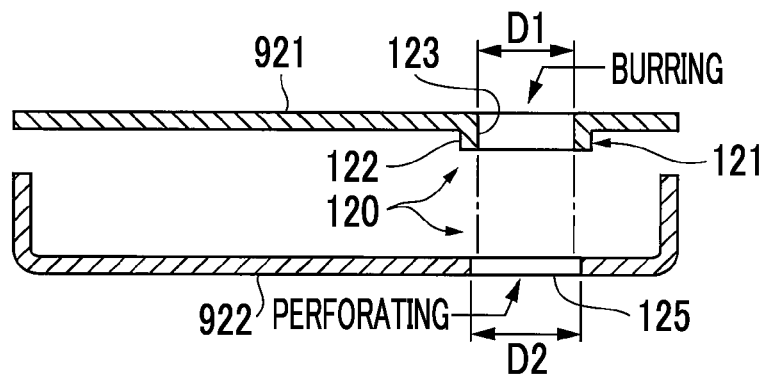
Figure 10C:
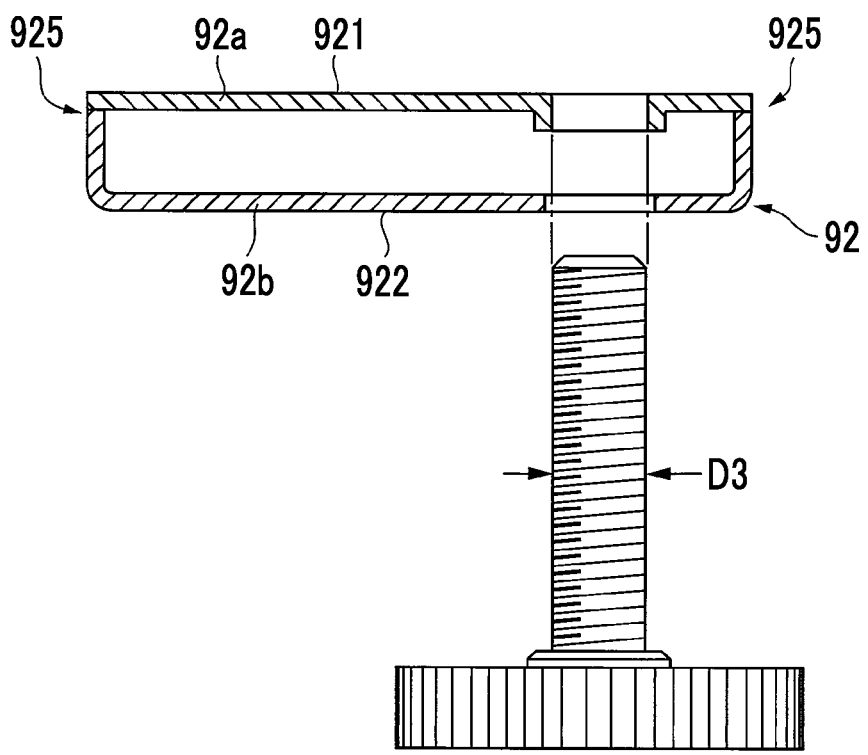

In this example, as the left-right frame material 92, for example, as shown in FIG. 10A, a flat plate-shaped first frame material 921 and a second frame material 922 having a U-shaped cross section are prepared, as shown in FIG. 10B, the extruded portion 121 is formed at a predetermined position of the first frame material 921 by extrusion and the through-hole 125 is formed at a predetermined position of the second frame material 922 by perforating, and as shown in FIG. 10C, the first frame material 921 and the second frame material 922 are joined to each other by a fixing method 925 such as welding to obtain a square pipe having a flat closed cross-sectional structure having a rectangular cross section, whereby the extruded portion 121 is arranged in the plate material 92a located on the upper side and the through-hole 125 is arranged immediately below the extruded portion 121 in the plate material 92b located on the lower side.

In this example, the extruded portion 121 is formed by performing perforating on the first frame material 921 and then performing flange forming on the circumference of the hole to make a rising flange 122 protrude downward, and furthermore, a female thread portion 123 into which the male thread portion 113 of the rod 112 of the adjuster foot 111 can be screwed is formed on the inner circumference of the rising flange 122. The female thread portion 123 may be formed at the same time as the flange forming, or after the flange forming.

In this example, a hole diameter D2 of the through-hole 125 needs to be formed larger than a diameter D1 of the valley of the female thread portion 123 of the extruded portion 121, and is set larger than an outer diameter D3 of the male thread portion 113 of the rod 112 of the adjuster foot 111.

In this example, as the through-hole 125, a hole having a size through which the stepped portion 117 of the adjuster foot 111 cannot pass is selected.

In this example, a distance g between the extruded portion 121 and the through-hole 125 in the up-down direction is selected so that the rod 112 maintains the state of being inserted through the extruded portion 121 and the through-hole 125 in a state in which the adjuster foot 111 is lowered to the ground contact position (when the height adjustment is actually performed).

Here, the hole diameter D2 of the through-hole 125 is, for example, preferably selected to be within the elastic deformation region of the rod 112 although the rod 112 of the adjuster foot 111 is elastically deformed when the adjuster foot 111 receives a load during falling of the image forming apparatus.

The through-hole 125 is, for example, preferably formed with a tolerance equal to or greater than the tolerance of the hole diameter of the extruded portion 121.

Method of Using Adjuster

During Height Adjustment

Figure 7:
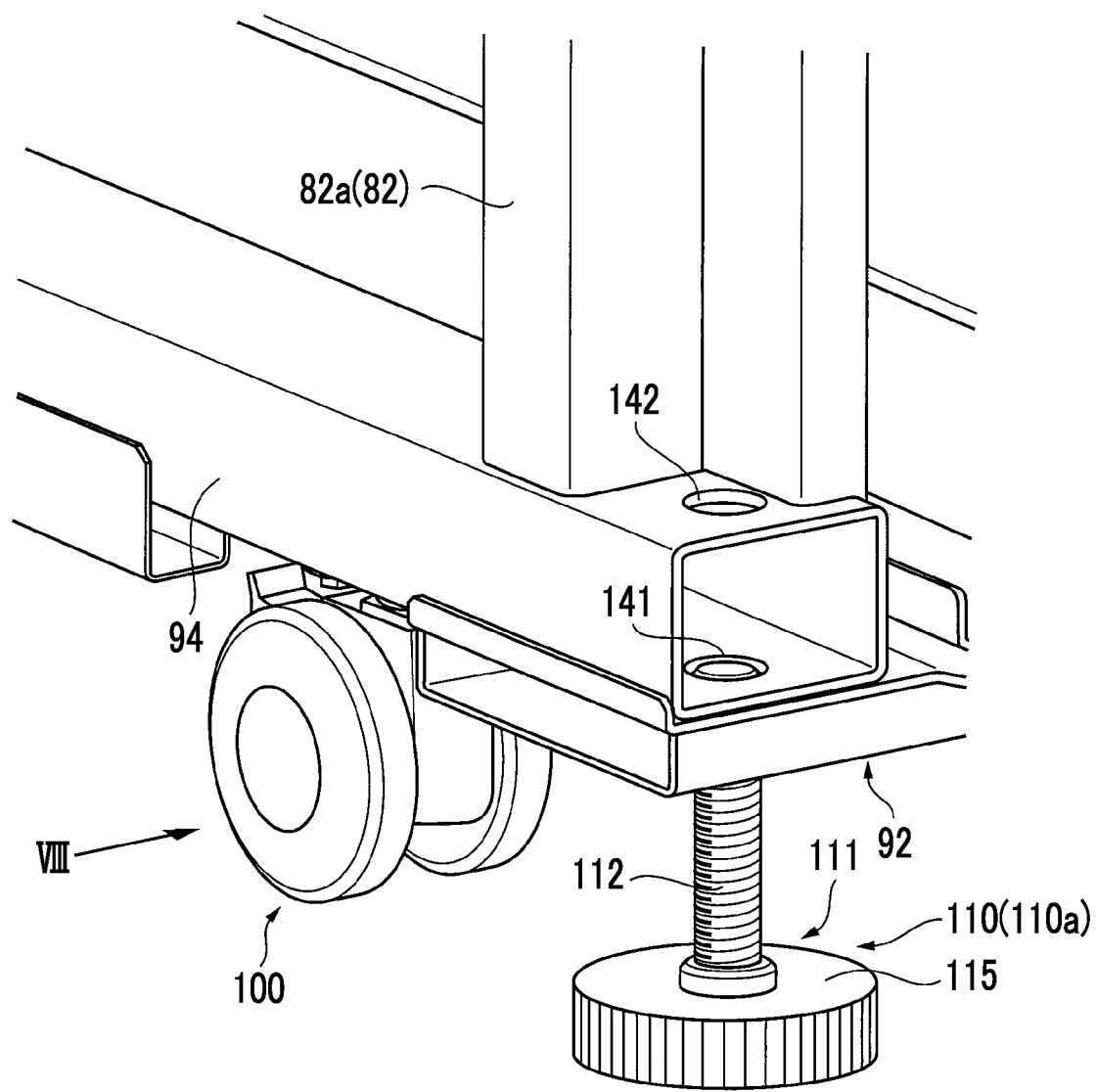
FIG. 7 is an explanatory view showing details of the support component provided on the front left side of the housing structure according to the first exemplary embodiment.
Figure 11:
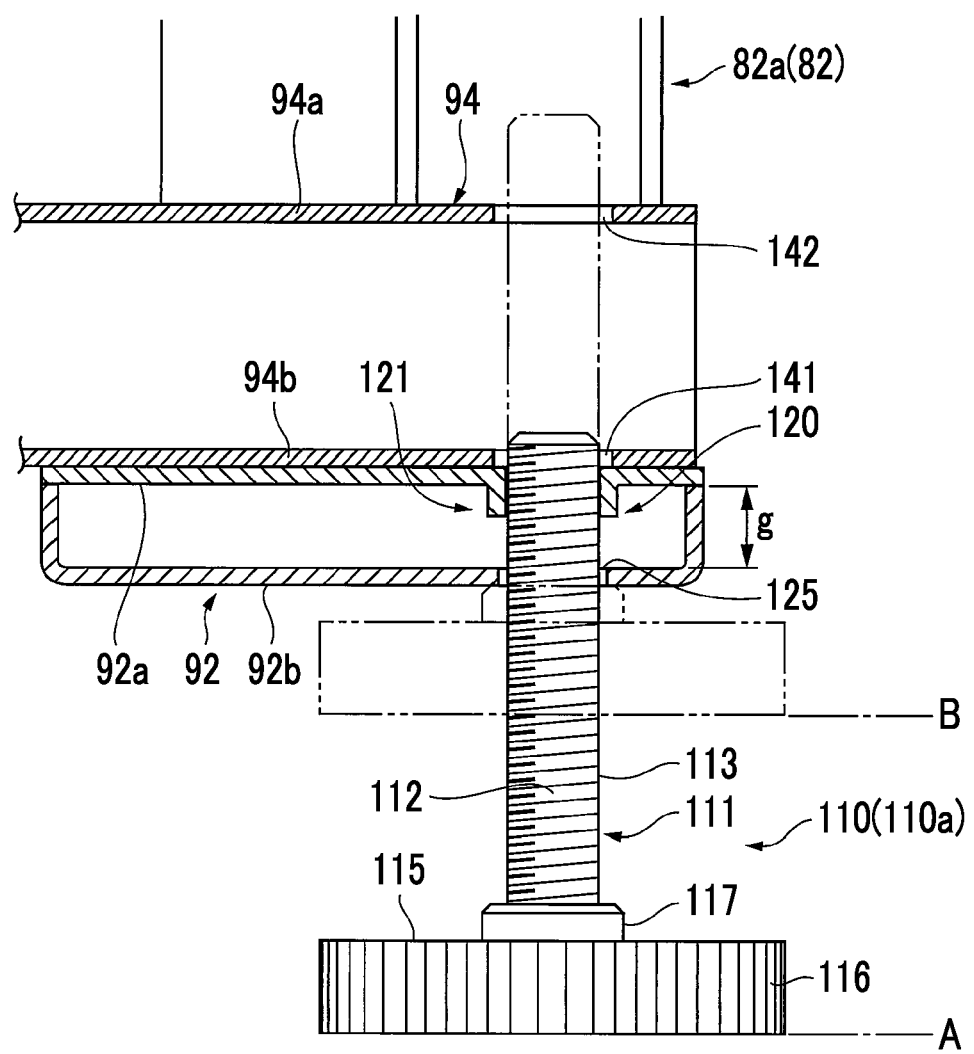
FIG. 11 is an explanatory view showing a usage form of the support component according to the first exemplary embodiment.

In installing the image forming apparatus, as shown in FIGS. 7 and 11, in a case where the pedestal portion 115 of the adjuster foot 111 is rotated, the male thread portion 113 of the rod 112 of the adjuster foot 111 moves in a ground contact direction along the female thread portion 113 of the extruded portion 121, and for example, as indicated by the two-dot chain line in FIG. 11, the adjuster foot 111 that had been retreated to a retreat position B can be lowered to a ground contact position A indicated by the solid line.

In a state in which the adjuster foot 111 reaches the ground contact position A, the adjuster foot 111 maintains a state in which the rod 112 is inserted into the extruded portion 121 and the through-hole 125 included in the receiving component 120.

Figure 12A:
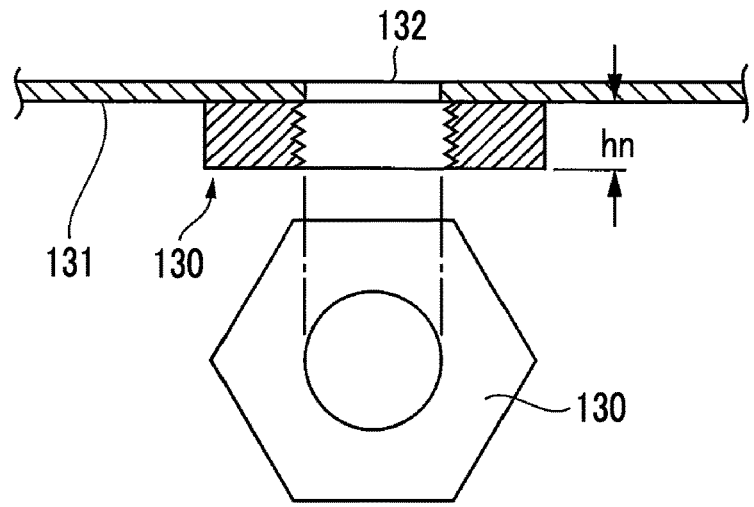
FIG. 12A is an explanatory view showing a comparative example in which a nut is used as a receiving component of a support component.
Figure 12B:
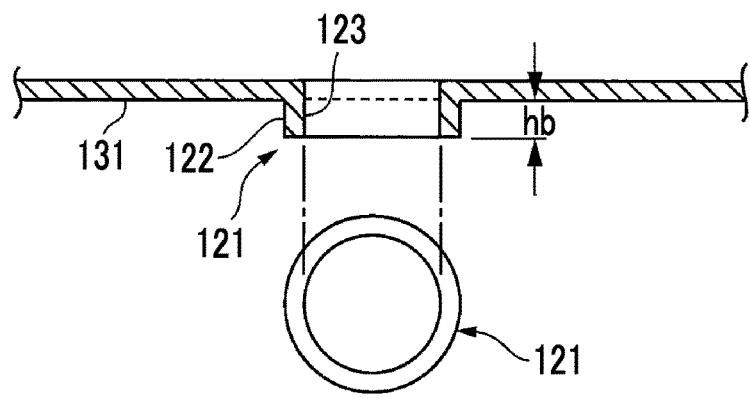
FIG. 12B is an explanatory view showing a configuration example of an extruded portion as a receiving component of a support component, and FIG.

In this case, the adjuster foot 111 is supported in a state of being screwed into the extruded portion 121. However, as shown in FIG. 12A, in a form in which a hole portion 132 is provided in a support plate material 131 instead of the extruded portion 121 (see FIG. 12B), a nut member 130 is fixed to the lower surface of the support plate material 131 in alignment with the hole portion 132, and the nut member 130 is used as a support portion of the adjuster foot 111, a thickness hn of the nut member 130 is larger than the extruded portion 121 and thus the supporting strength of the adjuster foot 111 is sufficiently secured. However, as in this example, in a form in which the extruded portion 121 is used, since a height hb of the rising flange 122 is low, the region of the female thread portion 123 is small, and the supporting strength of the adjuster foot 111 is reduced accordingly.

Figure 12C:
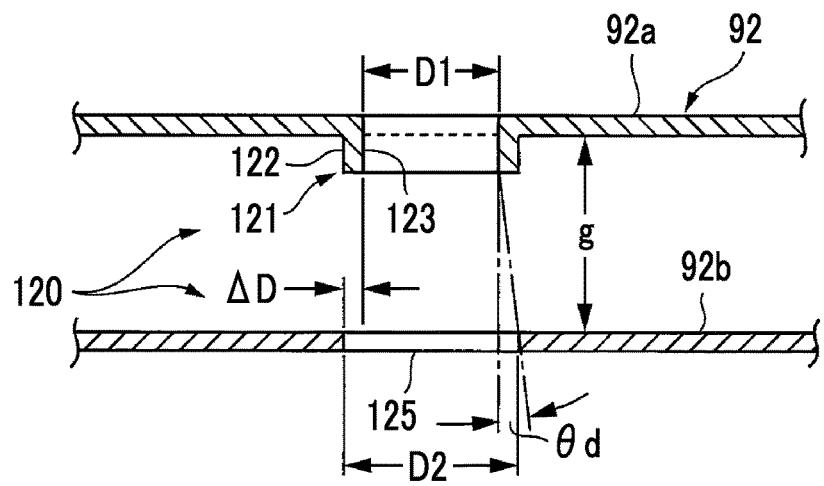

However, in this example, as shown in FIG. 12C, since the receiving component 120 of the adjuster foot 111 has the extruded portion 121 and the through-hole 125 between the plate materials 92a and 92b at the distance g located on the upper and lower sides of the left-right frame material 92, for example, in a case where a large weight load of the image forming apparatus is applied to the adjuster foot 111, the rod 112 of the adjuster foot 111 is elastically deformed due to the weak supporting strength of the extruded portion 121, the tilting of the rod 112 can be prevented by the inner circumference of the through-hole 125, and in this stage, and the rod 112 is supported at the two points, the extruded portion 121 and the through-hole 125 of the left-right frame material 92. Therefore, the elastic deformation of the rod 112 is suppressed, and the supporting strength of the adjuster foot 111 is maintained.

In this case, in a case where the difference between the hole diameter D1 of the extruded portion 121 and the hole diameter D2 of the through-hole 125 is $\Delta D$, the rod 112 of the adjuster foot 111 is inclined by $\theta d = \Delta D/g$ at the maximum due to the elastic deformation.

As described above, even though the rod 112 of the adjuster foot 111 is elastically deformed at the maximum, since the rod 112 is supported by the through-hole 125 together with the extruded portion 121, the image forming apparatus is prevented from falling. In this case, $\theta d$ is, for example, 5° at maximum, and g is preferably set to 6 mm or more.

During Retreat

In a case of installing the image forming apparatus, in a case where an installation location is selected by moving the image forming apparatus with the casters 100, the adjuster foot 111 may be held at the retreat position B indicated by the two-dot chain line in FIG. 11 so that the adjuster 110 does not interfere with the moving operation of the image forming apparatus.

In this example, when the adjuster foot 111 is located at the retreat position B, the pedestal portion 115 and the stepped portion 117 of the adjuster foot 111 are arranged at positions where the pedestal portion 115 and the stepped portion 117 are not inserted through the through-hole 125, and the rod 112 of the adjuster foot 111 is inserted through the through-hole 125 and the extruded portion 121 and is furthermore arranged to pass through the plate material 92a located on the upper side of the left and right frame materials 92.

In this state, in this example, since the adjuster 110 is arranged at the intersection between the longitudinal end portion of the left-right frame material 92 and the front-rear frame material 94, escape holes 141 and 142 through which the rod 112 can be inserted are formed at points corresponding to the extruded portion 121 in a plate material 94a located on the upper side of the front-rear frame material 94 and further a plate material 94b located on the lower side thereof. These escape holes 141 and 142 may have at least a hole diameter larger than the outer diameter of the male thread portion 113 of the rod 112.

Therefore, in this example, the adjuster foot 111 is held at the retreat position B during retreating without being disturbed by the presence of the front-rear frame material 94.

In the present exemplary embodiment, the male thread portion 113 of the rod 112 of the adjuster foot 111 is formed in substantially the entire area of the rod 112. However, the male thread portion 113 may be formed, for example, on the upper side of the rod 112 and the lower side near the pedestal portion 115 and the intermediate portion thereof may be formed to have a smaller diameter than the male thread portion 113.

Direction of Formation of Extruded Portion

In the present exemplary embodiment, as shown in FIG. 13A, the extruded portion 121 is configured in a form in which the extruded portion 121 protrudes downward from the plate material 92a located on the upper side of the left-right frame material 92. During height adjustment of the adjuster 110, the upper end portion of the rod 112 of the adjuster foot 111 is screwed into the extruded portion 121 at a position closer to the ground contact position A than the plate material 92a. The maximum value of a length L1 of the adjuster foot 111 that protrudes downward from the lower end position of the extruded portion 121 and reaches the ground contact position A is larger than the interval between the plate material 92a and the ground contact position A. Contrary to this, in a modified form shown in FIG. 13B, the extruded portion 121 is configured in a form in which the extruded portion 121 protrudes upward from the plate material 92a located on the upper side of the left-right frame material 92. In this case, in a case where the length of the rod 112 of the adjuster foot 111 is selected in the same manner as in FIG. 13A, during height adjustment of the adjuster 110, in a state in which the upper end portion of the rod 112 of the adjuster foot 111 is screwed into the extruded portion 121, a length L2 of the adjuster foot 111 that protrudes downward from the lower end position of the extruded portion 121 and reaches the ground contact position A is shorter than L1, and accordingly, the adjustment margin of the adjuster foot 111 for the ground contact position A decreases.

The Other Adjuster 110b

In this example, as shown in FIGS. 6, 14, and 15, the adjuster 110 (110b) includes the adjuster foot 111 as a leg component for height adjustment and the receiving component 120 that receives and supports the adjuster foot 111.

In this example, the basic configurations of the adjuster foot 111 and the receiving component 120 are substantially the same as the adjuster 110 (110a).

FIG. 14 shows a state of the adjuster foot 111 and the receiving component 120 (the extruded portion 121 and the through-hole 125) that receives the adjuster foot 111 during height adjustment by the adjuster 110.

In the figure, the adjuster foot 111 is brought into contact with the ground contact position A for height adjustment in a state in which the male thread portion 113 of the rod 112 is inserted through the extruded portion 121 and the through-hole 125.

FIG. 15 shows a state of the adjuster foot 111 and the receiving component 120 (the extruded portion 121 and the through-hole 125) that receives the adjuster foot 111 during retreating of the adjuster 110.

Here, when the adjuster foot 111 is located at the retreat position B, the rod 112 of the adjuster foot 111 is arranged to be inserted through the through-hole 125 and the extruded portion 121, and further inserted through the plate material 92a located on the upper side of the left-right frame material 92.

In this state, in this example, since the adjuster 110 is arranged at the intersection between the longitudinal end portion of the left-right frame material 92 and the front-rear frame material 95, escape holes 143 and 144 through which the rod 112 can be inserted are formed at points corresponding to the extruded portion 121 in a plate material 95a located on the upper side of the front-rear frame material 95 and further a plate material 95b located on the lower side thereof. These escape holes 143 and 144 may have at least a hole diameter of the frame material larger than the outer diameter of the male thread portion 113 of the rod 112.

Relationship Between Adjuster and Housing Structure

In the present exemplary embodiment, the adjuster 110 includes the adjuster foot 111 and the receiving component 120 (the extruded portion 121 and the through-hole 125), and furthermore, maintains the supporting strength of the receiving component 120 using the left-right frame material 92 having a closed cross-sectional structure.

Here, while the left-right frame material 92 having a closed cross-sectional structure forms a portion of the housing bottom portion 81, in this example, since the front-rear frame materials 94 and 95 are provided to intersect both longitudinal end portions of the left-right frame material 92, the left-right frame material 92 is firmly supported also by the front-rear frame materials 94 and 95 of the housing bottom portion 81.

Furthermore, in the present exemplary embodiment, the housing column frames 82 (specifically, 82a and 82b) are provided at points corresponding to portions where the adjusters 110 are provided in both the longitudinal end portions of the left-right frame material 92, and even though a large load of the equipment weight is applied to the adjuster foot 111 during height adjustment by the adjuster 110, the load is further distributed also by the housing column frames 82 (specifically, 82a and 82b) having a large supporting rigidity, so that falling of the adjuster foot 111 is effectively suppressed.

First Comparative Form

FIG. 16A shows an adjuster 110' according to a first comparative form.

In this example, the adjuster 110' includes the same adjuster foot 111 as in the first exemplary embodiment, a square pipe 150 as a frame is further provided with a hole (not shown) through which the adjuster foot 111 is inserted, a nut member 151 directed downward is welded to the lower surface of a plate material located on the upper side of the square pipe 150, and the male thread portion 113 of the rod 112 of the adjuster foot 111 is screwed into the nut member 151.

In this example, although the supporting strength of the nut member 151 for the adjuster foot 111 is sufficiently secured, it is difficult to perform an operation of welding the nut member 151 into the square pipe 150.

Second Comparative Form

In this example, the adjuster 110' includes the same adjuster foot 111 as in the first exemplary embodiment, a extruded portion 161 directed upward is further provided in a flat plate 160 as a frame material, and the male thread portion 113 of the rod 112 of the adjuster foot 111 is screwed into the extruded portion 161.

In this example, in a case where the equipment load of the image forming apparatus or the like is small (for example, 150 kg or less), the supporting strength of the adjuster foot 111 by the extruded portion 161 can be withstood. However, in a case where the equipment load is large, there is concern that the supporting strength may be insufficient.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A support component comprising:
    a leg component having a male thread portion that is provided on at least an upper side of a rod extending in a height direction, and a pedestal portion that is provided larger than the rod and provided at a lower end portion of the rod; and
    a receiving component having an extruded portion that is provided, in a frame material including two vertically separated plate materials constituting a housing bottom portion of an equipment, in the plate material located on an upper side of the frame material and into which the male thread portion of the rod is screwed, and a through-hole that is provided in the plate material located on a lower side of the frame material and through which the rod passes,
    wherein the plate material located on an upper side of the frame material is a flat plate-shaped plate material, and
    the plate material located on a lower side of the frame material is a plate material having a U-shaped cross section, and
    the frame material is configured to have a closed cross-sectional structure having a rectangular cross section formed by joining the plate material located on the upper side of the frame material to the plate material located on the lower side of the frame material,
    wherein the support component enables height adjustment in a state in which the rod of the leg component is inserted through the extruded portion and the through-hole of the receiving component.

2. The support component according to claim 1,
    wherein a distance between the extruded portion and the through-hole in an up-down direction is selected so that the rod maintains a state of being inserted through the extruded portion and the through-hole in a state in which the leg component is lowered to ground contact position.

3. The support component according to claim 2, wherein the extruded portion is formed by making the plate material located on the upper side protrude downward.

4. The support component according to claim 1, wherein the through-hole is selected to be larger than a diameter of a valley of a female thread portion of the extruded portion.

5. The support component according to claim 4, wherein the through-hole is selected to be within an elastic deformation region of the rod in a case where the leg component receives a load of the equipment.

6. The support component according to claim 4, wherein the through-hole is formed with a tolerance equal to or greater than a tolerance of a hole diameter of the extruded portion.

7. The support component according to claim 5, wherein the through-hole is formed with a tolerance equal to or greater than a tolerance of a hole diameter of the extruded portion.

8. A housing structure comprising:
the support component according to claim 1;
a frame material in which the receiving component of the support component is formed; and
a housing that has the frame material as a portion of a housing bottom portion and is framed together with another frame material.

9. The housing structure according to claim 8, wherein an upper portion of the frame material in which the extruded portion is formed in the receiving component is connected and fixed to the other frame material.

10. The housing structure according to claim 9, wherein the other frame material is a closed cross-sectional structure having a rectangular cross section or a columnar member extending in a height direction.

11. The housing structure according to claim 9, wherein, when the leg component of the support component is retreated to a non-use position, an escape hole through which the rod of the leg component is inserted is formed in the other frame material.

12. An equipment comprising:
the housing structure according to claim 8; and
various equipment elements mounted in the housing structure.

13. The equipment according to claim 12, further comprising:
a plurality of movable casters at a lower portion of the housing,
wherein the support component is provided at a corner of the lower portion of the housing on a side away from support points of the plurality of casters.

* * * * *